Jan. 26, 1943.　　　　M. S. ARIENS　　　　2,309,157
TINE MOUNTING
Filed July 19, 1940
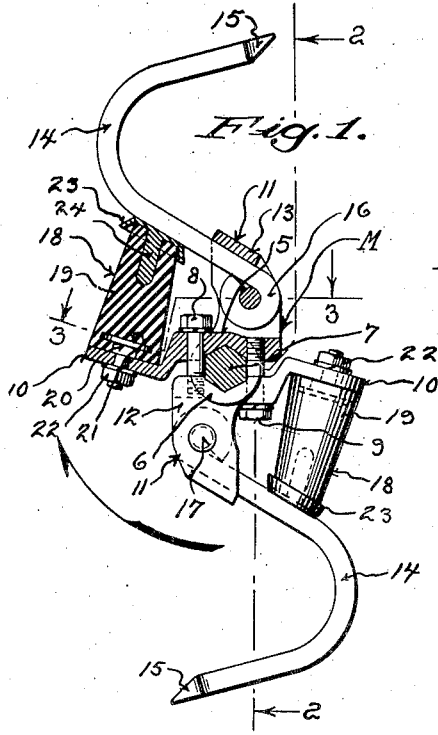
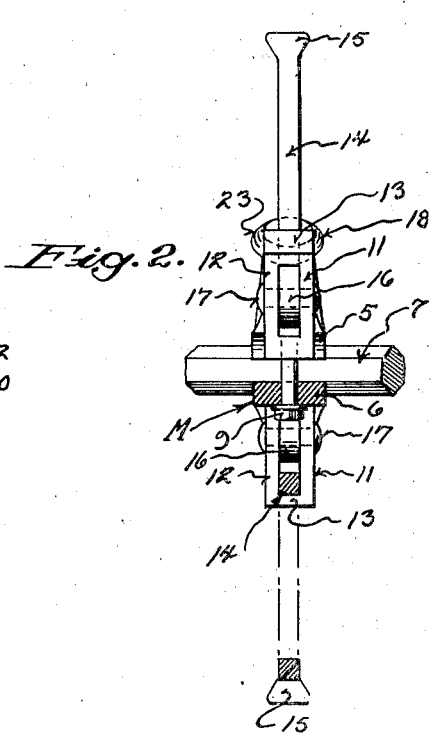
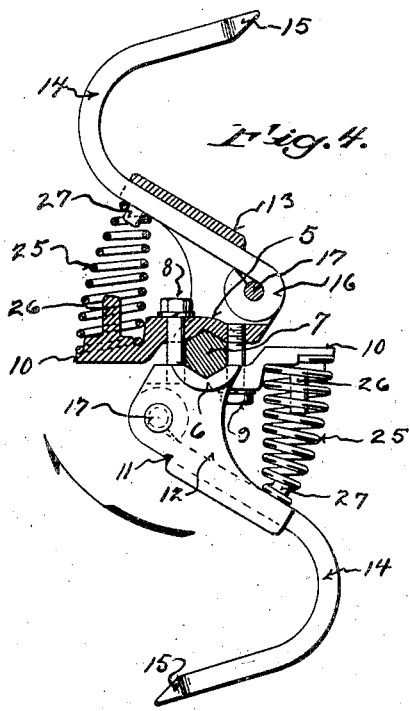
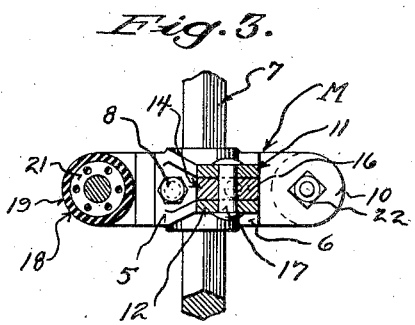
Inventor
M. S. Ariens
By
Attorneys

Patented Jan. 26, 1943

2,309,157

UNITED STATES PATENT OFFICE 2,309,157

TINE MOUNTING

Mando S. Ariens, Brillion, Wis.

Application July 19, 1940, Serial No. 346,355

3 Claims. (Cl. 97—216)

This invention appertains to a rotary tiller or similar ground-working machine, and more particularly to a novel mounting and assembly for the ground-engaging tines.

One of the primary objects of my invention is the provision of means for resiliently mounting the tines in proper working position and for cushioning the shock of engagement of the tines with the ground, whereby to effectively prevent breakage of the tines and the mounting.

Another salient object of my invention is to provide a novel mounting for the ground-working tines on the rotary shaft, whereby movement of the tines is positively limited in one direction and resiliently limited in the other direction.

A further important object of my invention is to provide hub blocks for pivotally supporting the tines, with a guide on the blocks for limiting the movement of the tines in one direction, and a cushioning bumper for resiliently limiting the movement of the tines in the opposite direction.

A still further object of my invention is to provide a tine mounting which will be of an exceptionally simple and durable construction, and which will effectively accomplish the purpose intended.

With these and other objects in view, the invention consists in the novel construction, arrangement, and formation of parts, as will be hereinafter more specifically described, claimed, and illustrated in the accompanying drawing, in which drawing:

Figure 1 is a side elevational view of my novel tine mounting, with parts thereof broken away and in section to illustrate structural details, the rotary shaft for the tines being also shown in section.

Figure 2 is a sectional view taken on the line 2—2 of Figure 1, looking in the direction of the arrows.

Figure 3 is a detail sectional view taken at right angles to Figure 2, and on the line 3—3 of Figure 1, looking in the direction of the arrows.

Figure 4 is a view similar to Figure 1, showing another preferred form of resiliently cushioning the movement of the tines.

Referring to the drawing in detail, wherein similar reference characters designate corresponding parts throughout the several views, the letter M generally indicates my novel mounting, and the same includes a pair of companion clamping hub blocks 5 and 6, disposed on opposite sides of the rotary shaft 7, which forms a part of the ground-working machine.

The shaft 7 is of a polygonal shape in cross section, and the inner faces of the clamp blocks 5 and 6 are shaped to agree with the configuration of the shaft, whereby the blocks will turn with said shaft. The blocks, on opposite sides of the shaft, receive set screws 8 and 9, which firmly hold the blocks on the shaft. Each block is provided with an angularly extending abutment foot 10 and a substantially radially extending guide 11. The guides 11 include side plates 12 and a connecting cross plate 13.

In accordance with my invention, I employ tines 14, which are substantially of a U-shape, and the tines at one end are provided with ground-engaging pointed teeth 15, while the other ends of the tines are curled to form eyes 16. The tines can be formed from resilient metal, and the U-shape thereof gives a certain resiliency to these tines. The eye portions of the tines are received within the guides 11 on the blocks 5 and 6, and pivots 17 extend through the eyes 16 and the side walls 12 of the guides.

In order to hold the tines in their operative ground-engaging position against the cross stop plates 13, I employ bumpers 18. As shown in Figures 1 to 3, inclusive, the resilient bumpers 18 can take the form of frusto-conical rubber cushion blocks 19.

These rubber cushion blocks 19 are disposed between the stop feet 10 and the tines 14 adjacent the pivot points of the tines. The inner ends of the rubber blocks 19 carry studs 20, and the inner ends of the studs can have formed thereon or secured thereto perforated washers 21, which are molded within the rubber blocks. The studs 20 extend through openings in the stop feet 10, and the studs are firmly secured to the feet by means of nuts 22. The outer ends of the cushion rubber blocks carry wear cups 23, and these wear cups have formed thereon shanks 24, which are received in openings formed in the rubber cushion blocks. The wear cups engage the tines.

In use of my mounting, the rubber cushion blocks effectively hold the tines against the cross plates 13, and, if preferred, the blocks can be placed under a slight tension during the mounting of the blocks and tines. Thus, the rubber cushion blocks effectively hold the tines in proper working position, and, as the tines engage the ground, the rubber blocks cushion the shock of the engagement of the tines with the ground, and effectively prevent breakage of the tines and the mounting.

Obviously, coil springs 25 can be substituted for the cushion blocks, and such springs are shown in Figure 4 of the drawing. The springs are of a helical type and have the bases thereof fitted around studs 26, formed on the abutment feet 10 on the clamp blocks 5 and 6.

In this form, the cross plates 13 of the guides can be elongated, and the guides or the tines can carry relatively short studs 27 for fitting in the upper ends of the spring convolutions. These springs function in the same manner as the rubber cushion blocks.

From the foregoing description it can be seen that I have provided an exceptionally simple and durable mounting for the tines of rotary tillers or similar machines.

Changes in details may be made without departing from the spirit or the scope of my invention, but what I claim as new is:

1. In a rotary ground-working machine, a rotary shaft, clamp blocks rigidly secured to the shaft, angularly extending stop feet on the blocks at one end thereof, outwardly extending guides on the other ends of the blocks, substantially U-shaped ground-engaging tines rockably mounted on the guides and extending over the feet, resilient cushioning members disposed between and engaging the feet and the tines, and cross plates on said guides engaging the opposite faces of the tines from said cushioning members.

2. In a rotary ground-working machine, a rotary shaft, clamp blocks rigidly secured to the shaft, angularly extending stop feet on the blocks at one end thereof, outwardly extending guides on the other ends of the blocks, substantially U-shaped ground-engaging tines rockably mounted on the guides and extending over the feet, resilient cushioning members disposed between and engaging the feet and the tines, and cross plates on said guides engaging the opposite faces of the tines from said cushioning members, said cushioning members consisting of rubber blocks.

3. In a rotary ground-working machine, a rotary shaft, clamp blocks rigidly secured to the shaft, angularly extending stop feet on the blocks at one end thereof, outwardly extending guides on the other ends of the blocks, substantially U-shaped ground-engaging tines rockably mounted on the guides and extending over the feet, resilient cushioning members disposed between and engaging the feet and the tines, and cross plates on said guides engaging the opposite faces of the tines from said cushioning members, said cushioning members consisting of coil springs.

MANDO S. ARIENS.